United States Patent [19]
Weinacker

[11] Patent Number: 5,947,060
[45] Date of Patent: Sep. 7, 1999

[54] ANIMAL ROPE CHEW

[76] Inventor: Charles Weinacker, 901 Gayer Ave., Fairhope, Ala. 36532

[21] Appl. No.: 08/984,853

[22] Filed: Dec. 4, 1997

[51] Int. Cl.⁶ .............................. A01K 29/00; G09F 3/00
[52] U.S. Cl. .............................. 119/709; 40/316; 57/210; 87/3
[58] Field of Search .................................... 119/707, 709, 119/710, 711; 40/316, 665; 57/200, 210, 236; 87/3, 4

[56] References Cited

U.S. PATENT DOCUMENTS

| | | | |
|---|---|---|---|
| 951,147 | 3/1910 | Porter | 40/316 X |
| 1,216,964 | 2/1917 | Dodge | 40/316 |
| 1,274,401 | 8/1918 | Everett | 40/316 |
| 1,282,390 | 10/1918 | Dodge | 40/316 |
| 1,635,750 | 7/1927 | Jenks | 40/316 |
| 1,738,316 | 12/1929 | Reber | 40/316 |
| 2,594,610 | 4/1952 | Cripe | 57/210 |
| 4,924,811 | 5/1990 | Axelrod | 119/710 |
| 5,477,815 | 12/1995 | O'Rourke | 119/710 |
| 5,560,320 | 10/1996 | Plunk | 119/709 |

Primary Examiner—Michael J. Carone
Assistant Examiner—James S. Bergin
Attorney, Agent, or Firm—Rader, Fishman & Grauer PLLC

[57] ABSTRACT

An animal chew including a plurality of fibers which are wound together to form rope strands. Two or more rope strands are twisted together to form a rope segment. A ribbon baring indicia is either interlaced with the rope segments or helically twisted around the perimeter of the rope segment. The indicia printed on the ribbon can either be of a fun nature, a commercial nature, or a public safety nature.

4 Claims, 4 Drawing Sheets

ANIMAL ROPE CHEW

TECHNICAL FIELD

This application relates to animal chews and more particularly relates to dog chews fabricated from rope.

BACKGROUND OF THE INVENTION

Animal chews are widely available both for promoting dental hygiene in animals and for pet toys. Chews can be fabricated from any number of materials ranging from rope, plastic, nylon, pig and cow by products, and the like. While animal chews are generally known, heretofore, it has not been known to fabricate an animal chew from a rope wherein the rope is interlaced with a ribbon or the like carrying indicia such as names, slogans, advertisements, or the like.

Thus it is an object of the present invention to provide an animal chew which is comprised of rope or other fibers having an indicia carrying ribbon interwoven therewith.

DETAILED DESCRIPTION OF A PREFERRED EMBODIMENT

Figure 1:
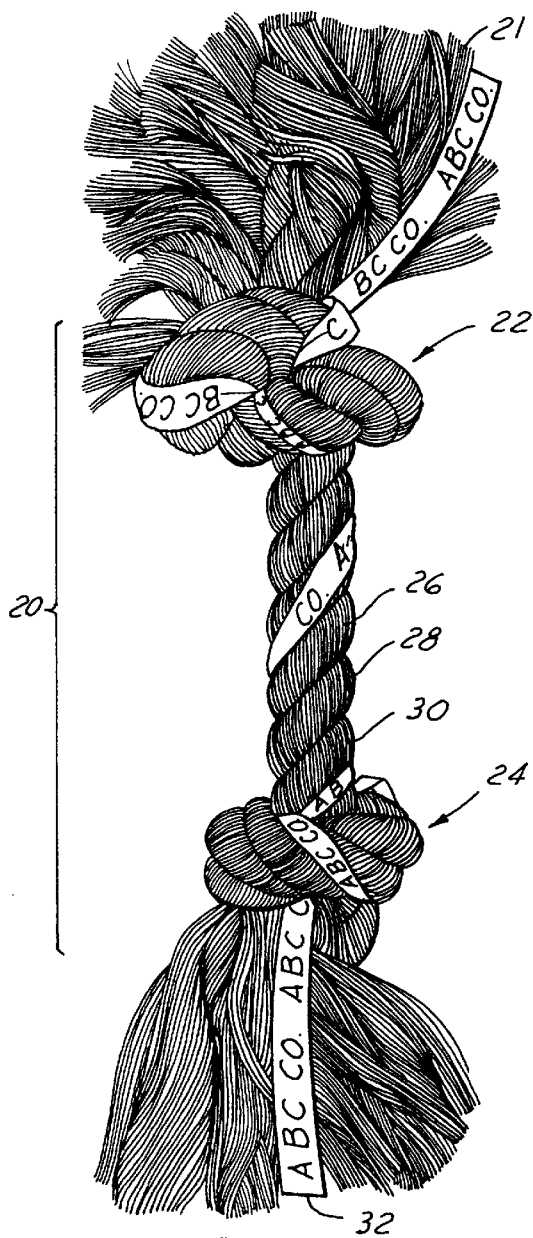
FIG. 1 is a front plan view of the chew of the present invention.
Figure 2:
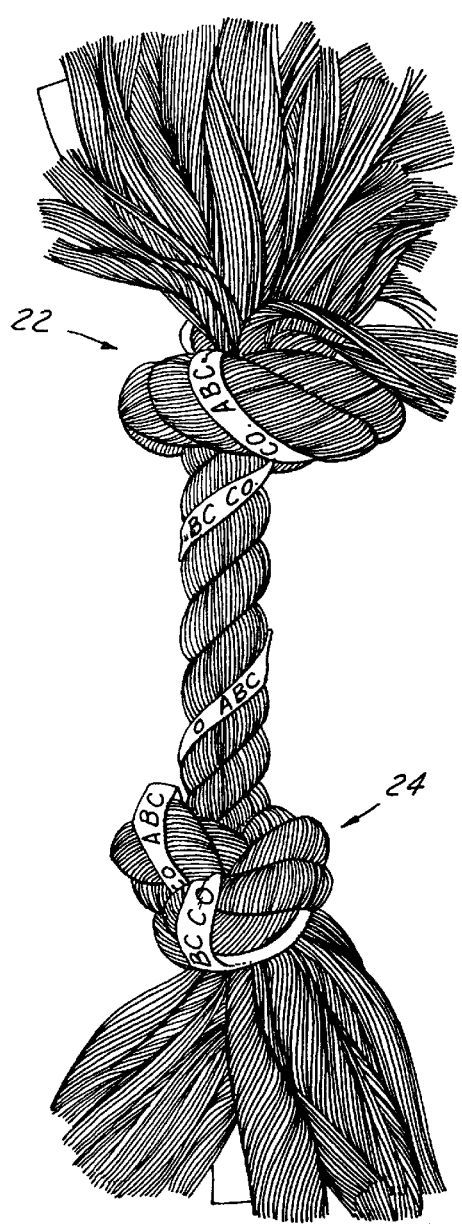
FIG. 2 is a rear view of the chew of the present invention.
Figure 3:
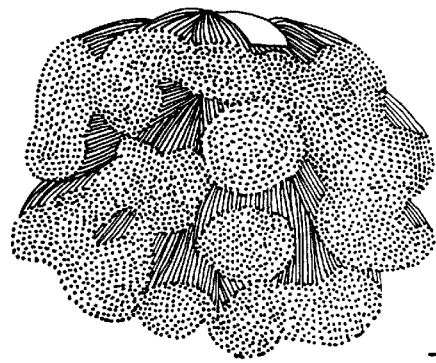
FIG. 3 is a bottom view of the chew of the present invention.
Figure 4:
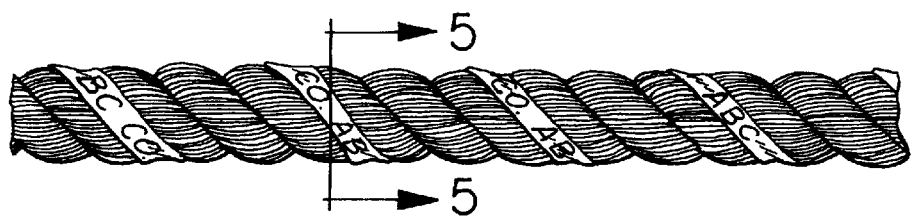
FIG. 4 is a rope segment prior to knotting it into the chew of FIG. 1.

Now Referring to FIG. 1, the first embodiment of the chew of the present invention includes rope segment 20 which is knotted at a first end 22 and a second end 24. Rope segment 20 is constructed from two distinct elements. Firstly a plurality of fibers 21 are wound around one another forming a rope strand 26. Next, a plurality of rope strands 26, 28, and 30 are wound around one another forming rope segment 20. It is common for a rope to have three rope strands however, any combination of two or more rope strands may be twisted together to form rope segment 20. Ribbon 32 is helically twisted around the outer perimeter of rope segment 20 prior to knots 22, 24 being place therein. Thus, rope segment 20 appears in FIG. 4 the way it looks prior to knots 22, 24 being fashioned therein. In this first embodiment, ribbon 32 is not interwoven with strands 26, 28, and 30 but rather it is wound, helically, around the outside perimeter of segment 20.

Figure 5:
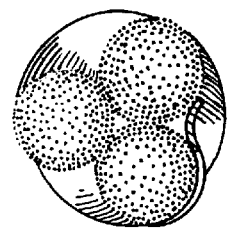
FIG. 5 is a cross sectional view taken substantially through lines 5—5 of FIG. 4.
Figure 9:
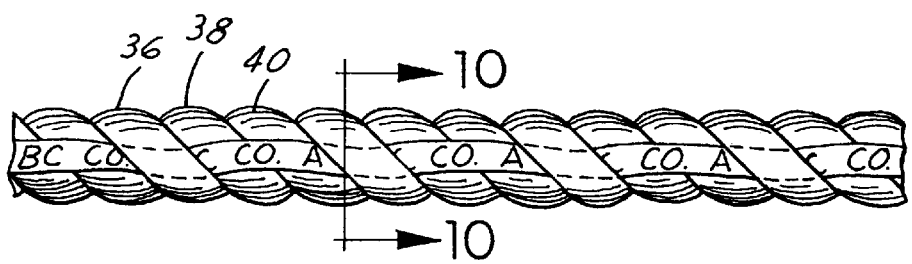
FIG. 9 is a rope segment of the second embodiment of the chew of the invention prior to knotting and fraying the ends.
Figure 10:
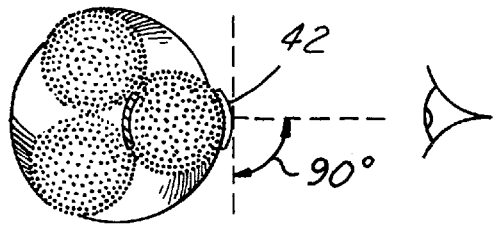
FIG. 10 is a cross sectional view taken substantially through lines 10—10 of FIG. 9.
Figure 6:
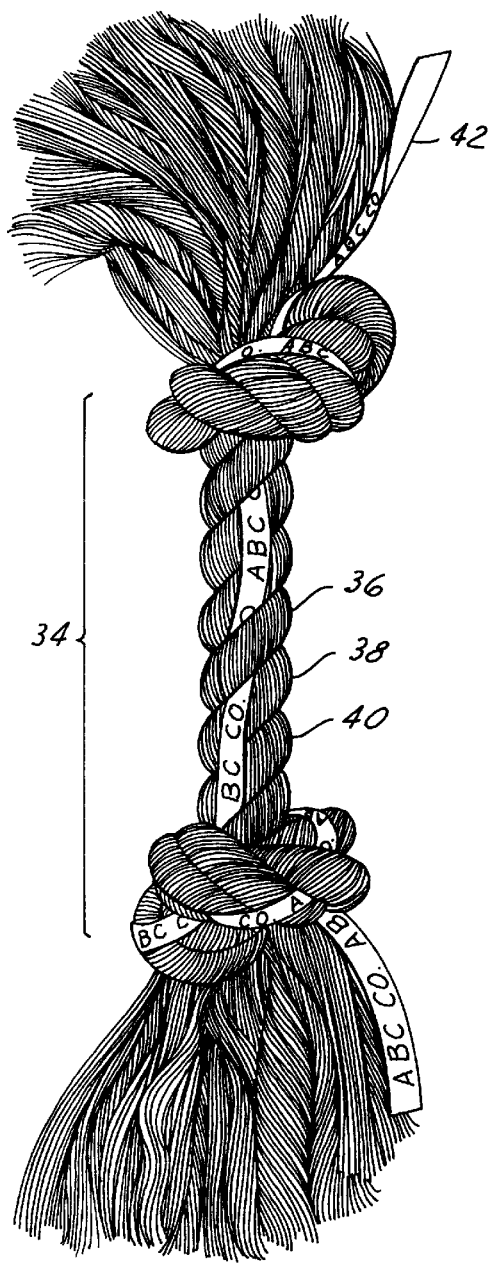
FIG. 6 is a front elevational view of a second embodiment of the chew of the present invention.
Figure 7:
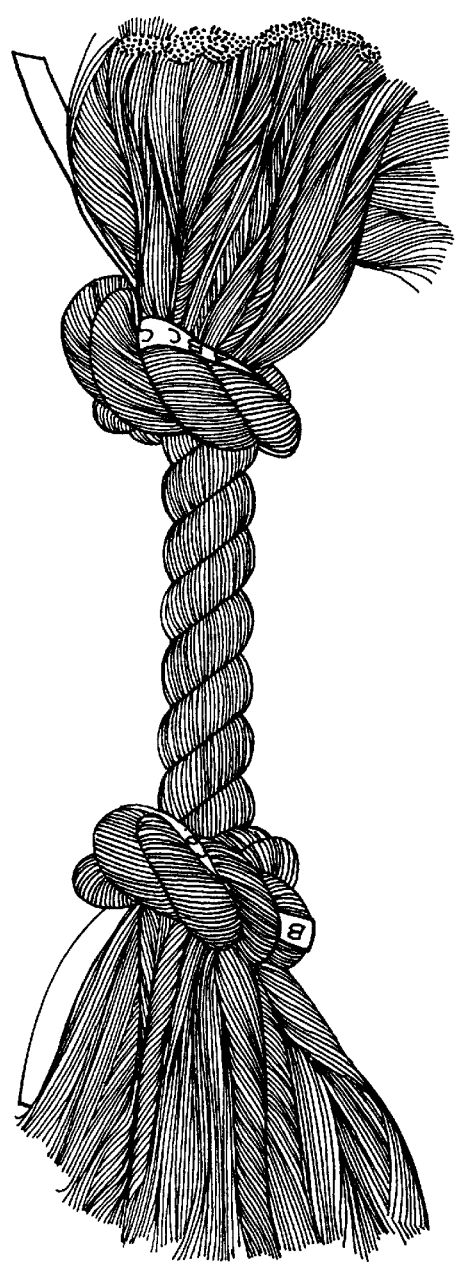
FIG. 7 is a rear view of the chew of FIG. 6.
Figure 8:
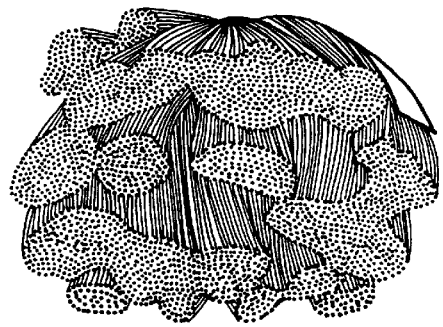
FIG. 8 is a bottom view of the chew of FIG. 6.

Now referring to FIGS. 6–10, in the second embodiment of the chew of the present invention ribbon 42 is not wound helically around the outer perimeter of rope segment 34 but rather it is interlaced between one or more twisted strands 36, 38, and 40. The embodiment of FIG. 6 disclosed three twisted strands 36, 38, and 40 and across sectional view thereof (see FIG. 10) shows ribbon 42 interlaced between a strands 36, 38, and 40 by interlacing ribbon 42 (as shown in FIGS. 9 and 10), the printed indicia lies generally at a 90° angle to the eye of the viewer thus making it easier to read the indicia printed thereon than the design set forth in FIGS. 4 and 5 wherein the ribbon is helically wound around the outside perimeter of the chew.

Figure 11:
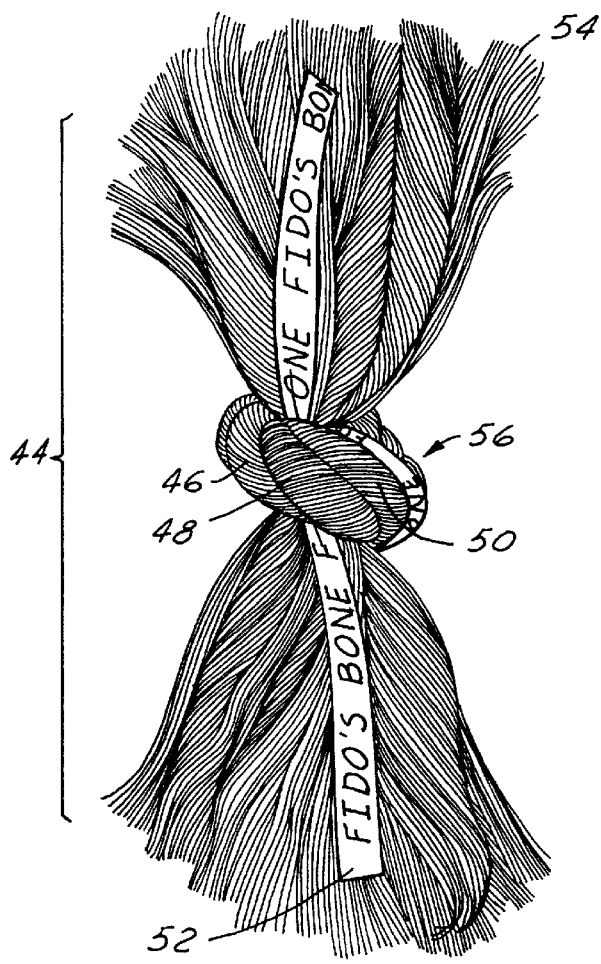
FIG. 11 is a front plan view of a third embodiment of the chew of the present invention.
Figure 12:
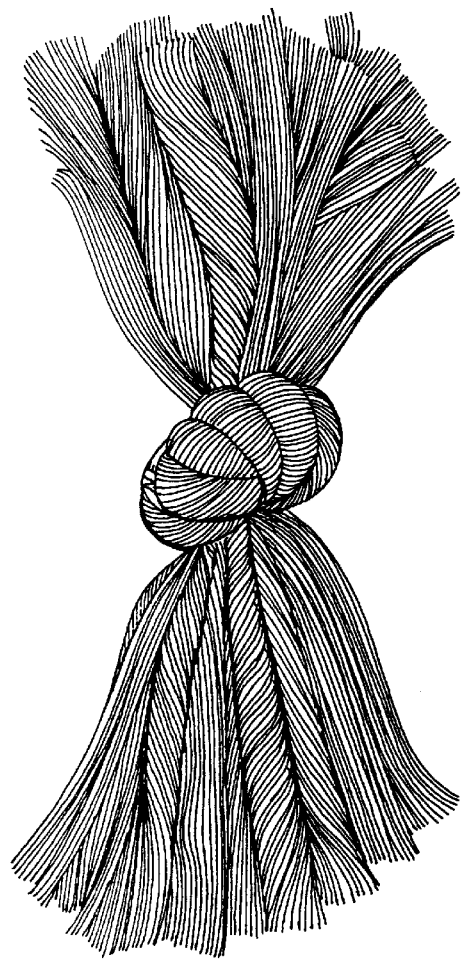
FIG. 12 is a rear view of the chew of FIG. 11.
Figure 13:
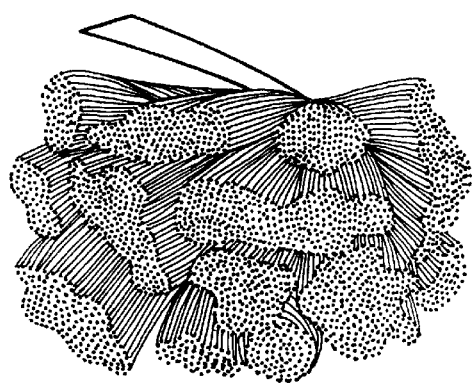
FIG. 13 is a bottom view of the chew of FIG. 11.

Now referring to FIGS. 11–13, in the third embodiment of the design of the present invention, rope segment 44 is comprised of a plurality of strands 46, 48, and 50. Ribbon 52 is, in essence treated as one of the fibers 54 and simply joined therewith by virtue of knot 56.

Preferably, rope segments 20, 34, and 44 are comprised of cotton or other substance which if ingested by an animal will not do any harm. Likewise, ribbon 32, 42, and 52 are also fashioned from other ingestable material. The indicia disposed on ribbons 32, 42, and 52 can either be printed or sewn thereon.

It is contemplated that the chews of the present invention can be used as promotional items promoting a certain company or a certain company program. Likewise, the ribbons can be printed with commonly used dog names and the like. Also, public safety messages or the like can be printed on the ribbons thus giving them an informative function along with being useful for generally promoting the dental hygiene of the animal which uses them.

The foregoing detailed description shows that the preferred embodiment of the present invention are well suited to fulfill the objects of the invention. It is recognized that those skilled in the art may make various modifications or additions to the preferred embodiments chosen here to illustrate the present invention without departing from the spirit of the present invention. Accordingly, it is to be understood that the subject matter sought to be afforded protection hereby should be deemed to extend to the subject matter defined in the appended claims, including all fair equivalence thereof.

What is claimed is:

1. An animal chew, comprising:
    an animal chew including a plurality of fibers wound together, a ribbon interlaced with said fibers, wherein said ribbon includes indicia disposed thereon wherein said plurality of fibers are wound into at least two separable rope strands; wherein said at least two strands are twisted together to form a body of the chew and said ribbon is non-helically interlaced between the strands.

2. The chew of claim 1, wherein said plurality of fibers are joined together in at least one knot.

3. The chew of claim 1, wherein said plurality of fibers each terminate into first and second ends, wherein said first ends of each fiber collectively terminate into a single knot, and wherein said second ends of each fiber collectively terminate into a second knot.

4. The chew of said claim 1, wherein said ribbon is generally flat.

* * * * *